United States Patent [19]

Wollen

[11] 4,201,830

[45] May 6, 1980

[54] IMPACT ABSORBANT ARTICLE COMPRISING FRANGIBLE CORE HAVING A TOUGH-SKINNED COVERING AND METHOD OF MAKING SAME

[75] Inventor: Carl H. Wollen, Comstock Park, Mich.

[73] Assignee: U.S. Industries, Grand Rapids, Mich.

[21] Appl. No.: 941,025

[22] Filed: Sep. 11, 1978

[51] Int. Cl.$^2$ .................. B62D 1/04; B62D 1/06; E04F 11/08; E04F 11/18

[52] U.S. Cl. .................................. 428/375; 52/99; 52/309.7; 52/727; 74/552; 180/78; 180/79; 180/271; 264/255; 428/401

[58] Field of Search ............... 52/727, 309.7, 98, 99; 74/552; 5/361 R; 428/401, 375; 264/255; 180/82 R

[56] References Cited

U.S. PATENT DOCUMENTS

| | | | |
|---|---|---|---|
| 3,362,749 | 1/1968 | Clement | 5/361 R |
| 3,382,511 | 5/1968 | Brooks | 5/361 R |
| 3,606,463 | 9/1971 | Brooks | 5/361 R |
| 3,922,429 | 11/1975 | Welch et al. | 428/315 |

FOREIGN PATENT DOCUMENTS

| | | | |
|---|---|---|---|
| 1555127 | 7/1966 | Fed. Rep. of Germany | 74/552 |
| 2264507 | 5/1972 | Fed. Rep. of Germany | 74/552 |
| 2281259 | 5/1976 | France | 74/552 |
| 897507 | 5/1962 | United Kingdom | 74/552 |

*Primary Examiner*—J. C. Cannon

[57] ABSTRACT

The specification discloses an energy absorbing structure having a rod-like lateral cross section such as a hand rail, steering wheel or the like in which an inner structural member is made of a material capable of providing rigid structural strength, but being frangible upon sharp impact of the type encountered in vehicle accidents so as to absorb energy from the impact, and an exterior covering generally surrounding the inner member and being made of a somewhat stretchable, flexible, tough skinned and nonabrasive plastic material of sufficient thickness and strength that in the event the inner member does break, the covering prevents sharp ends or edges of the broken inner member from protruding and impaling an individual impacting the structure.

60 Claims, 5 Drawing Figures

4,201,830

IMPACT ABSORBANT ARTICLE COMPRISING FRANGIBLE CORE HAVING A TOUGH-SKINNED COVERING AND METHOD OF MAKING SAME

BACKGROUND OF THE INVENTION

The present invention relates to structures having a rod-like lateral cross section of the type often found in vehicles such as cars, buses, trains, airplanes and the like. Examples would include the steering wheel in an automobile and a handrail in a bus, railroad car or airplane.

Usually, such structures comprise a steel rod or tube. Sometimes, the steel rod or tube is encased in a soft covering of a material such as polyvinyl chloride to give the member a soft feeling. Either way, the structural member is dangerous in the event of an accident. As a practical matter, the covering cannot be made sufficiently thick to prevent serious injury in the event an individual impacts the hand rail, steering wheel or the like.

For this reason, some prior artisans have developed steering wheel columns which are collapsible on impact. When the steering wheel is impacted during an accident, the entire steering column tends to collapse and thereby absorb the energy of impact. Such a structure is costly and is not particularly applicable in other objects of rod-like cross sections found in vehicles such as hand rails or the like.

SUMMARY OF THE INVENTION

The present invention comprises an energy absorbing structure for use in objects having a rod-like lateral cross section such as hand rails or steering wheels or the like in which an inner member is made of a rigid, structural plastic material capable of providing structural strength, but being frangible upon sharp impact of the type encountered in vehicle accidents so as to absorb the energy from the impact. An exterior covering is then provided which generally surrounds the inner member and is made of a somewhat stretchable, flexible, tough skinned and nonabrasive plastic material of sufficient thickness and strength that in the event the inner member breaks, the covering prevents sharp ends or edges of the broken inner member from protruding and impaling an individual who impacts the structure. The nonabrasiveness of the plastic covering prevents or minimizes a person from being scraped up by the impact.

These and other features, advantages, and objectives of the invention can be more fully understood by reference to the written specification and appended drawings.

DESCRIPTION OF THE PREFERRED EMBODIMENT

Figure 1:
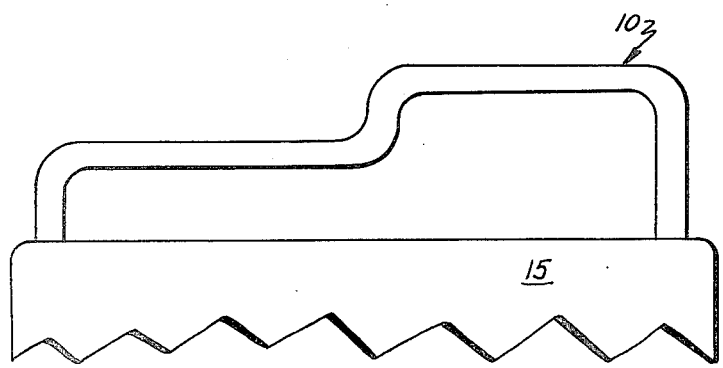
FIG. 1 is an elevational view of the upper portion of a transit seat having a hand rail mounted on top thereof.
Figure 2:
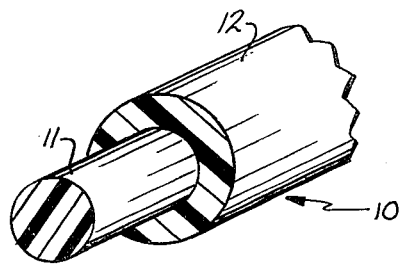
FIG. 2 is a perspective, broken view of the hand rail showing the inner structural member and the outer covering in cross section.

The rail 10 shown on the bus seat 15 is made in accordance with the present invention (FIG. 1). It comprises an inner structural core member 11 and an outer covering 12 surrounding the inner member 11 (FIG. 2).

Inner core member 11 has a rod-like lateral cross section and is made of a rigid structural plastic material which is capable of providing structural strength, but which is frangible upon sharp impact of the type encountered in vehicle accidents. This insures that at least some of the energy of the impact will be absorbed when inner member 11 breaks upon impact. Preferrably, inner member 11 is made of a structural foam material. Such a material can be both strong and rigid, and yet in the desired rod-like cross sectional configuration, is typically frangible upon a sharp impact. Further, structural foam is quite econimical as a structural material.

Examples of structural foam plastic materials which would be suitable include structural foam polycarbonate, structural foam polyethylene, structural foam polystyrene, structural foam polypropylene and structural foam ABS (acrylonitrile-butadiene styrene). Any of these materials can be glass filled or filled with other reinforcing materials, extenders or the like.

The structural foam inner member 11 should have a specific gravity as molded of from about 0.8 to about 0.9. To be sufficiently strong, it should have a thickness or effective thickness depending on its geometrical configuration of approximately one half to five eighths of an inch in diameter. Configurations other than circular cross section may be able to give the same strength as a $\frac{1}{2}$ to $\frac{5}{8}$ inch circular cross section bar, but at different thicknesses.

Exterior covering 12 generally surrounds inner member 11 and is molded of a material which is somewhat stretchable, flexible, tough skinned and nonabrasive. It must be of sufficient thickness and strength that in the event the inner member 11 breaks, covering 12 will yield and stretch somewhat and remain generally in tact so as to prevent sharp ends or edges of the broken inner member 11 from protruding and impaling an individual who impacts the structure. The nonabrasiveness of the plastic helps insure that abrasive injury to the impacting individual will be minimized.

Polyvinyl chloride having a hardness of from about 45 to about 90, most preferably 65 to 70, on the Shore A durometer scale is a preferred material and is an example of a material which would be suitable in accordance with the present invention. Its thickness should be about 1 quarter of an inch. The thickness not only contributes to the strength of the covering, but also helps to absorb protruding edges of a broken inner member 11 and thereby prevent them from breaking through the outer skin of covering 12 and dangerously protruding.

Figure 3:
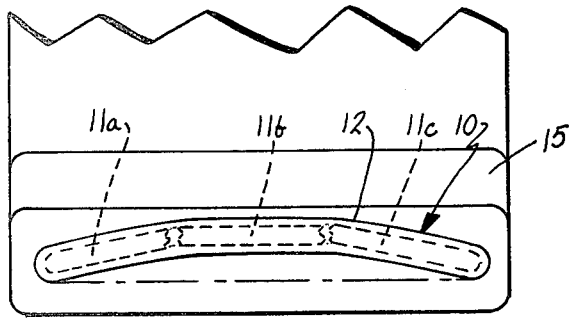
FIG. 3 is a top plan view of the seat of FIG. 1 illustrating what the hand rail might look like after the impact of an accident, with the inner member being shown by dashed lines.

In FIG. 3, hand rail 10 is shown after the impact of an accident. Inner member 11 (shown by dashed lines) has broken into three pieces and covering 12 has been stretched out of shape so that the entire hand rail 10 has been bent forwardly from its normal position which is shown by slanted lines. As can be seen, each of the three separate hand rail pieces 11a, 11b, and 11c terminates at sharp jagged ends. However, covering 12 has stretched and flexed without breaking and has remained in tact and has prevented any of these sharp edges from dangerously protruding. It is sufficiently thick and its skin sufficiently tough that sharp points have not broken through. The skin is sufficiently nonabrasive that skin abrasion is minimized. Excessive mineral fillers or glass fibers in covering 12 would render it too abrasive, as well as detract from its stretchability and flexibility.

Hand rail 10 is preferably made by first molding inner member 11 of structural foam material in an appropriate mold shaped to give inner member 11 the desired final configuration. Then, inner member 11 is placed in another mold having a larger cavity than inner member 11, which is shaped to the desired final configuration for hand rail 10. The plastic material of outer covering 12, preferably polyvinyl chloride, is then injectection molded into the second mold so as to form around inner member 11.

In this regard, it is important that the material of which inner member 11 is made has a melting point which is higher than the desired molding temperature of the material of which outer covering 12 is made. Where outer covering 12 is made of polyvinyl chloride, the melting point of the material of which inner member 11 is made should be greater than about 400° F. This will prevent inner member 11 from being destroyed by melting during the process of injection molding outer covering 12.

Figure 4:
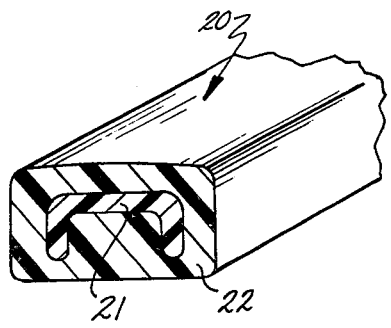
FIG. 4 is a fragmentary cross sectional view similar to FIG. 2, but showing an alternative but still rod-like cross sectional configuration for the hand rail, including for the inner member thereof.

In the alternative embodiment hand rail 20 shown in fragmentary portion only in FIG. 4, inner member 21 which is comparable to inner member 11 of hand rail 10, has been given a somewhat different configuration than inner member 11. Specifically, an inverted U-shaped configuration has been employed. Such alternative configurations might be employed to give greater beam strength to the inner member of the structure, and are still regarded for purposes of the present invention to have a generally rod-like lateral cross section.

The mold cavity in which outer covering 22 of hand rail 20 is molded has been given a generally rectangular configuration, which corresponds generally to the overall configuration of the inner member 21 (although such conformance is not required). As a result, hand rail 20 has a generally rectangular rod-like lateral cross section rather than the round lateral cross section of hand rail 10 shown in FIGS. 1 and 2.

Figure 5:
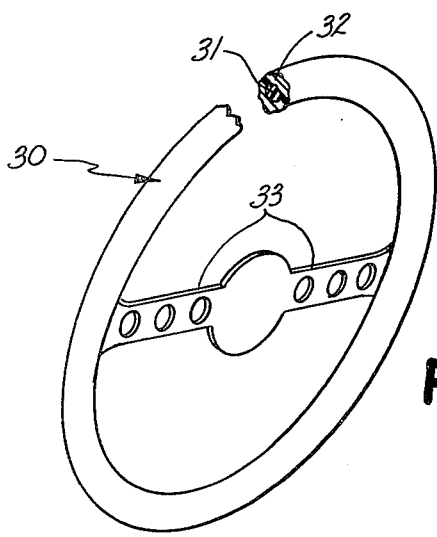
FIG. 5 is a generally perspective view of an automobile wheel made in accordance with the present invention, with a portion thereof being broken away so that the interior construction is visible.

FIG. 5 discloses yet another application of the structure of the present invention in a steering wheel 30. Even though the rim of steering wheel 39 is not a rod in the sense of being straight, it still has a rod-like lateral cross section as that term is used in describing this invention. One sees a structural foam inner member 31 comparable to structural foam inner members 21 and 11 of hand rails 10 and 20. Similarly, there is an exterior polyvinyl chloride covering 32 made of a material comparable to that of covering 22 or covering 12 of hand rails 20 or 10. Just as the outer rim of steering wheel 30 is made in accordance with the structure of this invention, so too the spokes 33 could be made employing a rigid, structural foam inner member and a polyvinyl chloride covering.

Naturally, the above are merely preferred embodiments of the present invention and various other structures having rod-like lateral cross sections could be made in accordance with the present invention. Various changes and alterations could be made in the preferred embodiments without departing from the spirit or broader aspects of the invention as defined by the claims set forth herein below, and including such equivalants thereof as may be allowed by law.

The embodiments of the invention in which an exclusive property or privilege is claimed are defined as follows:

1. A method for minimizing injury to an individual impacting a structure having a rod-like lateral cross section such as a handrail, steering wheel or the like, said method comprising:
   providing said structure with an inner member having a rod-like lateral cross section and being made of a structural plastic material which is capable when hardened of providing rigid, structural strength, but which is frangible upon sharp impact of the type encountered in vehicle accidents so as to absorb energy from the impact;
   providing an exterior covering surrounding said inner member made of a second plastic material which is somewhat stretchable, flexible, tough-skinned and non-abrasive and of sufficient strength and sufficient thickness that in the event said inner member breaks, said exterior covering prevents sharp ends or edges of the broken inner member from protruding and impaling an individual impacting said structure.

2. The method of claim 1 in which said inner member is molded of a structural foam plastic material.

3. The method of claim 2 in which said second plastic material is polyvinyl chloride.

4. The method of claim 3 in which said inner member is molded to a thickness of from about one half to about five eighths of an inch.

5. The method of claim 4 in which said exterior covering is molded to a thickness of approximately one quarter of an inch.

6. The method of claim 5 in which said exterior covering is molded of a polyvinyl chloride material having a hardness of from about 45 to about 90 on the Shore A durometer scale.

7. The method of claim 5 in which said exterior covering is molded of a polyvinyl chloride material having a hardness of from about 65 to 70 on the Shore A durometer scale.

8. The method of claim 7 in which said inner member is molded to a finished specific gravity of from about 0.8 to about 0.9.

9. The method of claim 8 in which said inner member is molded of one or more of the following materials: a structural foam polycarbonate, a structural foam polyethylene, a structural foam polystyrene, a structural foam polypropylene or a structural foam acrylonitrile-butadiene-styrene.

10. The method of claim 9 in which said inner member is molded of a material having a higher melting point than the molding temperature of said second material is used to mold said exterior covering.

11. The method of claim 10 in which said inner member is molded of a material having a melting point greater than 400° F.

12. The method of claim 1 in which said inner member is molded to a thickness of from about one half to about five eighths of an inch.

13. The method of claim 12 in which said inner member is molded to a finished specific gravity of from about 0.8 to about 0.9.

14. The method of claim 13 in which said exterior covering is molded of a polyvinyl chloride material having a hardness of from about 45 to about 90 on the Shore A durometer scale.

15. The method of claim 13 in which said exterior covering is molded of a polyvinyl chloride material having a hardness of from about 65 to about 70 on the Shore A durometer scale.

16. The method of claim 12 in which said inner member is molded of a material having a melting point greater than 400° F.

17. The method of claim 3 in which said inner member is molded of one or more of the following materials: a structural foam polycarbonate, a structural foam polyethylene, a structural foam polystyrene, a structural foam polypropylene, or a structural foam acrylonitrile-butadiene-styrene.

18. The method of claim 17 in which said exterior covering is molded to a thickness of approximately one quarter of an inch.

19. The method of claim 17 in which said inner member is molded of a material having a higher melting point than the molding temperature of said second material which is used to mold said exterior covering.

20. The method of claim 19 in which said inner member is molded of a material having a melting point greater than 400° F.

21. An energy absorbing structure having a rod-like lateral cross section such as a hand rail, steering wheel or the like, comprising: an inner member of rod-like lateral cross section made of a rigid, structural plastic material capable of providing structural strength but being frangible upon sharp impact of the type encountered in vehicle accidents so as to absorb energy from the impact; an exterior covering generally surrounding said inner member and being made of a somewhat stretchable, flexible, tough skinned and nonabrasive plastic material of sufficient thickness and strength that in the event said inner member breaks, said covering prevents sharp ends or edges of the broken inner member from protruding and impaling an individual impacting said structure.

22. The energy absorbing structure of claim 1 in which said inner member is made of a structural foam plastic material.

23. The energy absorbing structure of claim 2 in which said exterior covering is made of polyvinyl chloride plastic material.

24. The energy absorbing structure of claim 3 in which said inner member has a thickness of approximately one half to five eighths of an inch.

25. The energy absorbing structure of claim 24 in which said exterior covering has a thickness of approximately one quarter inch.

26. The energy absorbing structure of claim 25 in which said exterior covering has a hardness of from about 45 to about 90 on the Shore A durometer scale.

27. The energy absorbing structure of claim 25 in which said exterior covering has a hardness of from about 65 to about 70 on the Shore A durometer scale.

28. The energy absorbing structure of claim 27 in which said inner member has a specific gravity of from about 0.8 to about 0.9.

29. The energy absorbing structure of claim 28 in which said inner member is made of any one or more of the following materials: structural foam polycarbonate, structural foam polyethylene, structural foam polystyrene, structural foam polypropylene or structural foam acrylonitrile-butadiene-styrene.

30. The energy absorbing structure of claim 29 in which the material of which said inner member is made has a melting point which is greater than the molding temperature of the material of which said exterior covering is made.

31. The energy absorbing structure of claim 30 in which said inner member is made of a material having a melting point greater than 400° F.

32. The energy absorbing structure of claim 21 in which said exterior covering is made of polyvinyl chloride plastic material.

33. The energy absorbing structure of claim 31 in which said exterior covering has a hardness of from about 45 to about 90 on the Shore A durometer scale.

34. The energy absorbing structure of claim 31 in which said exterior covering has a hardness of from about 65 to about 70 on the Shore A durometer scale.

35. The energy absorbing structure of claim 34 in which said exterior covering has a thickness of approximately one quarter inch.

36. The energy absorbing structure of claim 32 in which said inner member is made of a material having a melting point greater than 400° F.

37. The energy absorbing structure of claim 22 in which said inner member has a specific gravity of from about 0.8 to about 0.9.

38. The energy absorbing structure of claim 37 in which said inner member has a thickness of approximately one half to five eighths of an inch.

39. The energy absorbing structure of claim 37 in which said inner member is made of any one or more of the following materials: structural foam polycarbonate, structural foam polyethylene, structural foam polystyrene, structural foam polypropylene or structural foam acrylonitrile-butadiene-styrene.

40. The energy absorbing structure of claim 37 in which the material of which said inner member is made has a melting point which is greater than the molding temperature of the material of which said exterior covering is made.

41. A method for manufacturing an energy absorbing structure having a rod-like lateral cross section such as a hand rail, steering wheel or the like, said method comprising of: molding an inner member into a configuration having a rod like lateral cross section of a structural plastic material which is capable when hardened of providing rigid, structural strength, but which is frangible upon sharp impact of the type encountered in vehicle accidents so as to absorb energy from the impact; placing said inner member into a second mold having a cavity which is larger in lateral cross section than the lateral cross section of said inner member and molding a second plastic material generally around said inner member within said mold to define an exterior covering on said inner member, said second plastic material being, when cooled and hardened, somewhat stretchable, flexible, tough skinned and nonabrasive and of sufficient strength, and molded to sufficient thickness, that in the event said inner member breaks, said exterior covering prevents sharp ends or edges of the broken inner member from protruding and impaling an individual impacting said structure.

42. The method of claim 41 in which said inner member is molded of a structural foam plastic material.

43. The method of claim 42 in which said second plastic material of said is polyvinyl chloride.

44. The method of claim 43 in which said inner member is molded to a thickness of from about one half to about five eighths of an inch.

45. The method of claim 44 in which said exterior covering is molded to a thickness of approximately one quarter of an inch.

46. The method of claim 45 in which said exterior covering is molded of a polyvinyl chloride material having a hardness of from about 45 to about 90 on the Shore A durometer scale.

47. The method of claim 45 in which said exterior covering is molded of a polyvinyl chloride material having a hardness of from about 65 to about 70 on the Shore A durometer scale.

48. The method of claim 47 in which said inner member is molded to a finished specific gravity of from about 0.8 to about 0.9.

49. The method of claim 48 in which said inner member is molded of one or more of the following materials: a structural foam polycarbonate, a structural foam polyethylene, a structural foam polystyrene, a structural foam polypropylene or a structural foam acrylonitrile-butadiene-styrene.

50. The method of claim 49 in which said inner member is molded of a material having a higher melting point than the molding temperature of said second material is used to mold said exterior covering.

51. The method of claim 50 in which said inner member is molded of a material having a melting point greater than 400° F.

52. The method of claim 21 in which said inner member is molded to a thickness of from about one half to about five eighths of an inch.

53. The method of claim 52 in which said inner member is molded to a finished specific gravity of from about 0.8 to about 0.9.

54. The method of claim 53 in which said exterior covering is molded of a polyvinyl chloride material having a hardness of from about 45 to about 90 on the Shore A durometer scale.

55. The method of claim 53 in which said exterior covering is molded of a polyvinyl chloride material having a hardness of from about 65 to about 70 on the Shore A durometer scale.

56. The method of claim 52 in which said inner member is molded of a material having a melting point greater than 400° F.

57. The method of claim 43 in which said inner member is molded of one or more of the following materials: a structural foam polycarbonate, a structural foam polyethylene, a structural foam polystyrene, a structural foam polypropylene, or a structural foam acrylonitrile-butadiene-styrene.

58. The method of claim 57 in which said exterior covering is molded to a thickness of approximately one quater of an inch.

59. The method of claim 57 in which said inner member is molded of a material having a higher melting point than the molding temperature of said second material which is used to mold said exterior covering.

60. The method of claim 59 in which said inner member is molded of a material having a melting point greater than 400° F.

* * * * *

UNITED STATES PATENT AND TRADEMARK OFFICE
CERTIFICATE OF CORRECTION

PATENT NO. : 4,201,830

DATED : May 6, 1980

INVENTOR(S) : Carl H. Wollen

It is certified that error appears in the above-identified patent and that said Letters Patent are hereby corrected as shown below:

Column 1, line 26:

after "steering" insert --wheel--

Column 2, line 25:

"econimical" should be --economical--

Column 2, line 47:

"in tact" should be --intact--

Column 3, line 3:

"in tact" should be --intact--

Column 3, line 18:

"injectection" should be --injection--

UNITED STATES PATENT AND TRADEMARK OFFICE
CERTIFICATE OF CORRECTION

PATENT NO. : 4,201,830
DATED : May 6, 1980
INVENTOR(S) : Carl H. Wollen

It is certified that error appears in the above—identified patent and that said Letters Patent are hereby corrected as shown below:

Column 3, line 51:

"39" should be --30--

Column 4, claim 10, line 59:

Delete "is"

Column 5, claim 22, line 44:

"1" should be --21--

Column 5, claim 23, line 47:

"2" should be --22--

Column 5, claim 24, line 50:

"3" should be --23--

UNITED STATES PATENT AND TRADEMARK OFFICE
CERTIFICATE OF CORRECTION

PATENT NO. : 4,201,830

DATED : May 6, 1980

INVENTOR(S) : Carl H. Wollen

It is certified that error appears in the above-identified patent and that said Letters Patent are hereby corrected as shown below:

Column 6, claim 43, line 68:

Delete "is"

Column 7, claim 50, line 30:

Delete "is"

Column 8, claim 52, line 1:

"21" should be --41--

Signed and Sealed this

Twenty-eighth Day of October 1980

[SEAL]

Attest:

Attesting Officer

SIDNEY A. DIAMOND

Commissioner of Patents and Trademarks